US011359920B2

(12) United States Patent
Knutson et al.

(10) Patent No.: US 11,359,920 B2
(45) Date of Patent: *Jun. 14, 2022

(54) DEAD-RECKONING GUIDANCE SYSTEM AND METHOD WITH CARDINAL-DIRECTION BASED COORDINATE-CORRECTIONS

(71) Applicant: Aptiv Technologies Limited, St. Michael (BB)

(72) Inventors: Eric P. Knutson, Kokomo, IN (US); David M. Spell, Kokomo, IN (US); Linh N. Pham, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 11 days.

This patent is subject to a terminal disclaimer.

(21) Appl. No.: 17/080,717

(22) Filed: Oct. 26, 2020

(65) Prior Publication Data

US 2021/0041238 A1 Feb. 11, 2021

Related U.S. Application Data

(63) Continuation of application No. 16/202,781, filed on Nov. 28, 2018, now Pat. No. 10,845,197.

(Continued)

(51) Int. Cl.
*G01C 21/16* (2006.01)
*B60C 23/04* (2006.01)
(Continued)

(52) U.S. Cl.
CPC .......... *G01C 21/16* (2013.01); *B60C 23/0488* (2013.01); *B60W 40/114* (2013.01); *G01S 19/49* (2013.01)

(58) Field of Classification Search
CPC .. G01C 21/16–21/188; B60C 23/0488; B60W 40/10; B60W 40/114; G01S 19/48;
(Continued)

(56) References Cited

U.S. PATENT DOCUMENTS 6,826,478 B2 11/2004 Riewe et al.
7,480,513 B2 1/2009 Woo
(Continued)

FOREIGN PATENT DOCUMENTS

EP 1586859 10/2005
JP 10019585 A * 1/1998

OTHER PUBLICATIONS

"Extended European Search Report", EP Application No. 19203251.4, dated May 6, 2020, 6 pages.

(Continued)

*Primary Examiner* — Angelina Shudy
(74) *Attorney, Agent, or Firm* — Sawtooth Patent Group PLLC

(57) ABSTRACT

A dead-reckoning guidance system determines a vehicle-speed of the host-vehicle based on wheel-signals from the one or more wheel-sensors; determines a distance-traveled by the host-vehicle during a time-interval since prior-coordinates of the host-vehicle were determined; determines a heading-traveled of the host-vehicle during the time-interval since the prior-coordinates of the host-vehicle were determined; determines present-coordinates of the host-vehicle based on the distance-traveled and the heading-traveled; determines when the vehicle-speed is greater than a speed-threshold; determines when the heading-traveled differs from a cardinal-direction by both greater than a noise-threshold and less than an angle-threshold; and in response to a determination that both the vehicle-speed is greater than the speed-threshold and that the heading-traveled differs (Continued)

from the cardinal-direction by both greater than the noise-threshold and less than the angle-threshold, determines a coordinate-correction to apply to the present-coordinates, said coordinate-correction determined in accordance with the distance-traveled and the cardinal-direction.

20 Claims, 4 Drawing Sheets

Related U.S. Application Data

(60) Provisional application No. 62/771,776, filed on Nov. 27, 2018.

(51) Int. Cl.
  *B60W 40/114* (2012.01)
  *G01S 19/49* (2010.01)

(58) Field of Classification Search
  CPC . G01S 19/49; G01S 5/01; G01S 5/011; G01S 5/012; G01S 5/013; G01S 5/014; G01S 5/015; G01S 5/016; G01S 5/017; G01S 5/018; G01S 5/019; G01S 19/485; G01P 9/00; G01P 9/02; G01P 9/04
  See application file for complete search history.

(56) References Cited

U.S. PATENT DOCUMENTS

| | | | |
|---|---|---|---|
| 7,543,392 B2 | 6/2009 | Kwon et al. | |
| 8,195,357 B2 | 6/2012 | Basnayake | |
| 8,249,807 B1 | 8/2012 | Barbeau et al. | |
| 8,396,659 B2 | 3/2013 | Ando et al. | |
| 8,447,518 B2 | 5/2013 | Tanino | |
| 9,283,967 B2 | 3/2016 | Lee | |
| 9,448,074 B2 | 9/2016 | Mizuno et al. | |
| 10,289,115 B2 * | 5/2019 | Hilnbrand | G05D 1/0278 |
| 10,845,197 B2 * | 11/2020 | Knutson | G01C 22/00 |
| 2003/0083805 A1 | 5/2003 | Stefan et al. | |
| 2005/0021229 A1 | 1/2005 | Lee et al. | |
| 2006/0115115 A1 | 6/2006 | Nagaoka et al. | |
| 2007/0037582 A1 * | 2/2007 | Mohi | H04W 4/029 455/456.1 |
| 2007/0037587 A1 * | 2/2007 | Mohi | G08G 1/205 455/456.5 |
| 2007/0037588 A1 * | 2/2007 | Mohi | H04W 4/029 455/456.5 |
| 2010/0332135 A1 * | 12/2010 | Toda | G01C 21/165 701/472 |
| 2013/0231014 A1 | 9/2013 | Knutson | |
| 2014/0214316 A1 | 7/2014 | Matsue | |
| 2016/0018229 A1 * | 1/2016 | Lee | B60W 30/14 701/409 |
| 2016/0023526 A1 | 1/2016 | Lavoie | |
| 2016/0035229 A1 | 2/2016 | Uchida et al. | |
| 2017/0176586 A1 * | 6/2017 | Johnson | G01C 17/38 |
| 2018/0370780 A1 | 12/2018 | Marsee | |
| 2019/0323842 A1 | 10/2019 | Tateda et al. | |
| 2020/0133280 A1 * | 4/2020 | Seccamonte | G05D 1/0242 |
| 2020/0166344 A1 | 5/2020 | Knutson et al. | |
| 2020/0192368 A1 * | 6/2020 | Bonanni | G01C 21/3819 |
| 2020/0223444 A1 * | 7/2020 | Bonanni | G06T 19/006 |

OTHER PUBLICATIONS

"Notice of Allowance", U.S. Appl. No. 16/202,781, filed Jul. 24, 2020, 14 pages.
"Extended European Search Report", EP Application No. 21189772.3, dated Dec. 23, 2021, 7 pages.

* cited by examiner

DEAD-RECKONING GUIDANCE SYSTEM AND METHOD WITH CARDINAL-DIRECTION BASED COORDINATE-CORRECTIONS

CROSS-REFERENCE TO RELATED APPLICATIONS

This application is a continuation of and claims priority to U.S. patent application Ser. No. 16/202,781, filed Nov. 28, 2018, which claims priority to U.S. Provisional Patent Application Ser. No. 62/771,776, filed Nov. 27, 2018, the disclosures of which are incorporated by reference herein in their entireties.

TECHNICAL FIELD OF INVENTION

This disclosure generally relates to a dead-reckoning guidance system, and more particularly relates to a system that determines a coordinate-correction to apply to the present-coordinates, where coordinate-correction is determined in accordance with the distance-traveled and the cardinal-direction.

BRIEF DESCRIPTION OF THE DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
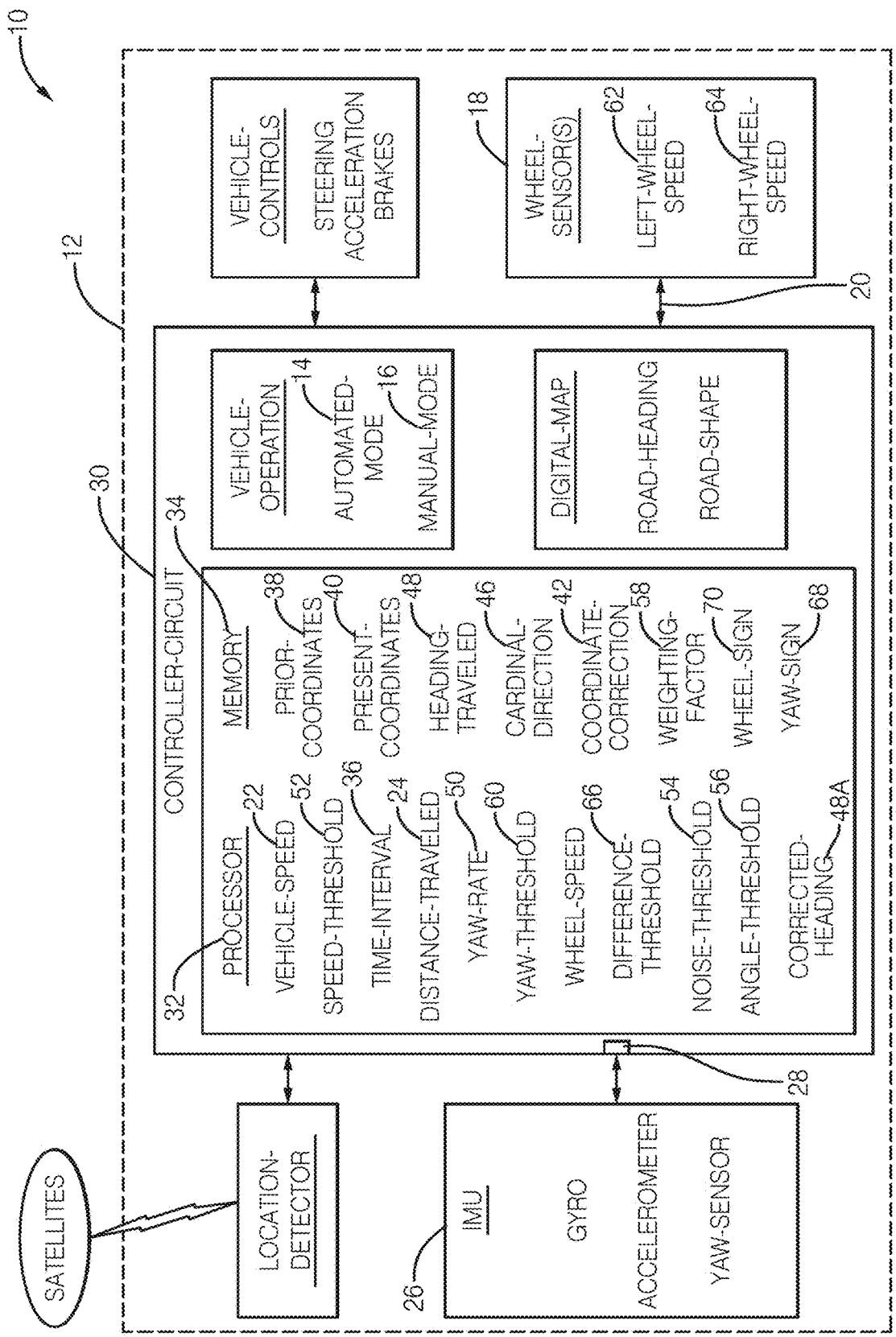
FIG. 1 is a diagram of a dead-reckoning guidance system for a vehicle in accordance with one embodiment.

FIG. 1 illustrates a non-limiting example of a dead-reckoning guidance system 10, hereafter often referred to as the system 10, which is used to keep track of position coordinates of a vehicle, e.g. a host-vehicle 12. As used herein, dead-reckoning is a means of tracking the position coordinates as the host-vehicle 12 moves that is particularly useful when the more traditional means of position tracking using a location-detector to receive signals from satellites that are part of, for example, a global-navigation-satellite-system (GNSS), which may be referred by some as global-positioning-system (GPS), to determine coordinates (e.g. latitude, longitude, elevation) is not an option or temporarily not available. As will be recognized by those in the art, GPS is sometimes not available because of, for example, the host-vehicle 12 traveling in a tunnel or urban canyon where the signals from the satellites are blocked and/or reflected causing positional ambiguities by multipath, or equipment failure. That is, dead-reckoning guidance may be characterized as a back-up for GPS, however it is recognized that this is not the only situation when the system 10 may be useful.

The host-vehicle 12 may be characterized as an automated vehicle, and may be referred to by some as an automated-mobility-on-demand (AMOD) type of vehicle. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a manual-mode 16 where the degree or level of automation may be little more than providing audible or visual information to the human-operator who is generally in control of the steering, accelerator, and brakes of the host-vehicle 12. For example, the system 10 may merely assist the human-operator as needed indicate an upcoming turn of a route to a destination.

The system 10 includes one or more instances of wheel-sensors 18 operable to detect movement of one or more wheels of the host-vehicle 12, which indicates or suggests movement of the host-vehicle 12. Devices suitable for use as the wheel-sensors 18 are known and commercially available. Such devices may output one or more instances of wheel-signals 20 that may be strings (i.e. a series) of electrical pulses or ticks, where each pulse or tick or transition indicates that a wheel has rotated some known amount, e.g. five-degrees-angle (5° ⌊). As will be recognized, if the diameter or circumference of the wheel or tire is known, then a vehicle-speed 22 and/or a distance-traveled 24 of the host-vehicle 12 can be determined from the wheel-signals 20. The distance-traveled 24 may be a straight-line distance traveled between two points regardless of yaw-rate, i.e. regardless of any curvature in the travel path between the two points, or an arc-distance if yaw-rate not zero, i.e. the path between the two points is curved.

The system 10 may include an inertial-measurement-unit 26 (IMU 26) that may be equipped with, for example, but not limited to, a gyroscope (e.g. an electronic gyroscope), one or more accelerometers, e.g. one or more instances of a linear-accelerometer such as a lateral-accelerometer, and/or one or more instances of an angular-accelerometer such as a yaw-sensor. Suitable examples of the IMU 26 and the devices that make-up the IMU 26 are known and commercially available, as will be recognized by those in the art.

The system 10 includes a controller-circuit 30 in communication with the one or more wheel-sensors via an input 28. The communication may be by way of wires, optical-cable, or wireless communication. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for determining position coordinates of the host-vehicle 12 based on signals received by the controller 30 as described herein.

The controller-circuit 30 is configured, e.g. programmed, to determine the vehicle-speed 22 of the host-vehicle 12 based on wheel-signals 20 from the one or more instances of the wheel-sensors 18, which may be averaged over a time-interval 36 since prior-coordinates 38 of the host-vehicle 12 were determined, or may instantaneous minimum or maximum values of samples during the time-interval 36. For example, the controller 30 may accumulate or count wheel-ticks or wheel-signal transitions during the time-interval 36, and then multiply by the count of wheel-ticks by a meters/tick value (a predetermined value based on the circumference of the wheel/tire) followed by dividing by the time-interval 36 to determine the vehicle-speed 22 in terms of, for example, meters/second or kilometers/hour. Alternatively, the vehicle-speed 22 could be calculated based on the relative position of an object detected by lidar/radar mapping. By looking at the movement of the vehicle in comparison to objects that are programmatically determined to be stationery, the vehicle-speed 22 or a distance traveled can be calculated.

The controller-circuit 30 is also configured, e.g. programmed, to determine the distance-traveled 24 by the host-vehicle 12 during the time-interval 36 since prior-coordinates 38 of the host-vehicle 12 were determined. As used herein, the prior-coordinates 38 are the position-coordinates of the host-vehicle 12 at the beginning or start of the time-interval 36, i.e. at the beginning or start of a segment of travel. As will be explained in more detail later, the system 10 described herein may use data from the IMU 26 and/or the wheel-sensors 18 to update or keep track of the position-coordinates of the host-vehicle 12 as the host-vehicle 12 moves using known dead-reckoning techniques. That is, data from the IMU 26 and/or the wheel-sensors 18 and/or lidar/radar units may be used to determine distance traveled and changes in direction or heading to generate a virtual bread-crumb trail that corresponds to movement of the host-vehicle. On a periodic basis, e.g. at the end of the time-interval 36, the system 10 may save the position coordinates as the present-coordinates 40, and possibly apply a coordinate-correction 42 to the present-coordinates 40 to minimize error that may be caused by tracking the position coordinates of the host-vehicle 12 using data from the IMU 26 and/or the wheel-signals 20. That is, the travel-path of the host-vehicle 12 is tracked over multiple segments of travel, where the start and end of each segment is determined or selected based on the time-interval 36. Each segment is analyzed to determine if some sort of a correction or error reduction can or should be made to prevent the long-term accumulation of errors in the position coordinates. The present-coordinates 40 at the end of one segment may be corrected using the coordinate-correction 42, and then that value (the present-coordinates 40 or the present-coordinates 40 plus all or part of the coordinate-correction 42 if calculated) is used as the prior-coordinates 38 for the next subsequent segment of travel. It is contemplated that the heading associated with the present-coordinates 40 may also be corrected or adjusted for use in a subsequent segment of travel.

Figure 2:
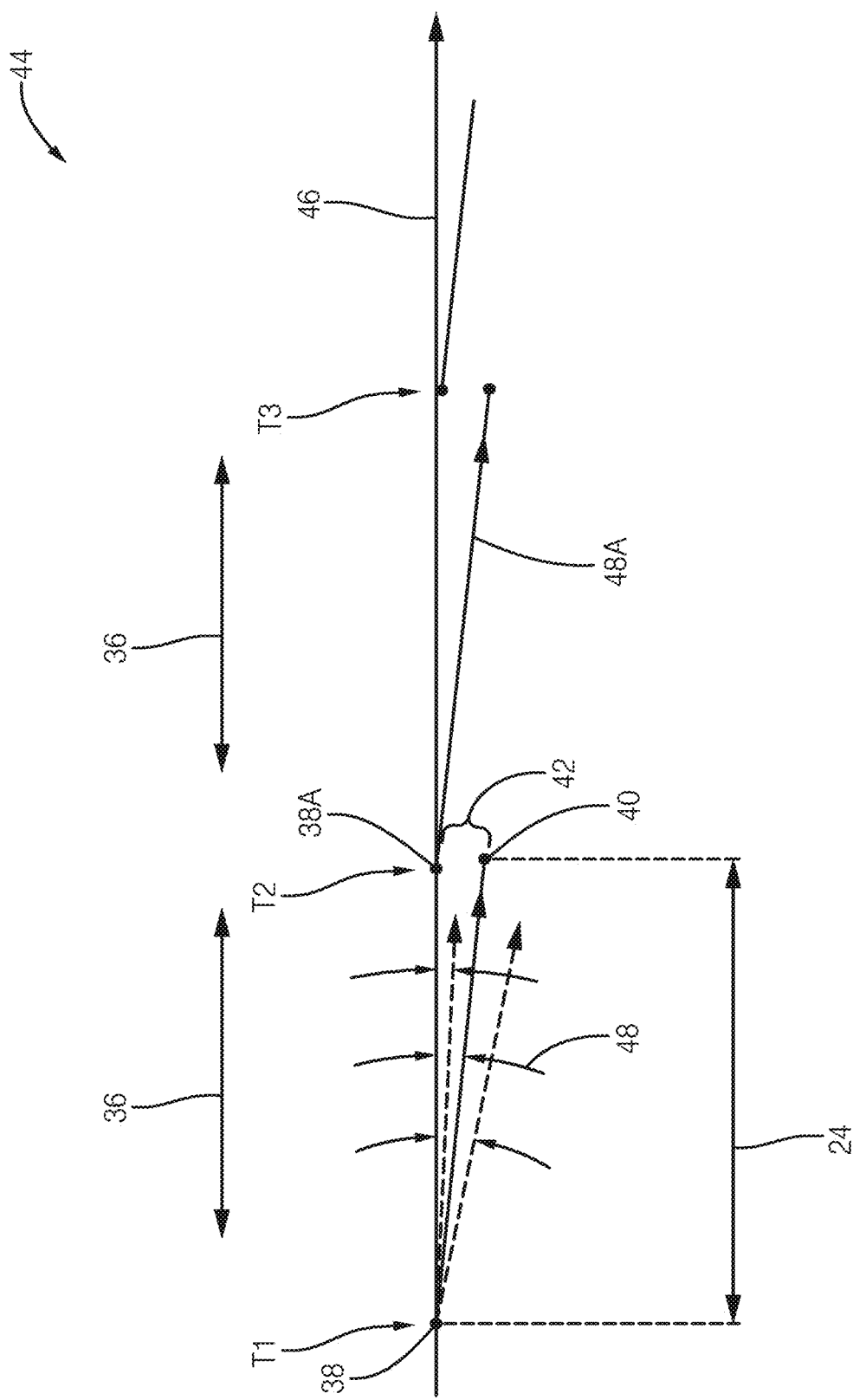
FIG. 2 is a scenario encountered by the system of FIG. 1 in accordance with one embodiment.

FIG. 2 illustrates a non-limiting example of a scenario 44 that the system 10 may encounter. It has been observed that roadways are often aligned with a cardinal-direction 46 of the compass, e.g. North/South or East/West. As such, if certain criteria or conditions are met, the system 10 may determine the coordinate-correction 42 based on an assumption that the road being traveled by the host-vehicle 12 is aligned with one of the four choices (North, South, East or West) for the cardinal-direction 46. In FIG. 2, the cardinal-direction is East, assuming a typical orientation for maps where North on FIG. 2 is up. At time T1 the host-vehicle 12 is at the prior-coordinates 38 of the T1→T2 interval of time. The value of the prior-coordinates 38 at T1 may be determined based on, but not limited to, GPS if available at or immediately prior to time T1, or based on previous coordinates determine using dead-reckoning, or based on optical detection of landmarks, or simply set to zero (0, 0, 0) if no other means is available to determine where the host-vehicle 12 is located at T1.

To determine the present-coordinates 40 at T2, the system 10 or the controller 30 is configured to determine a heading-traveled 48, i.e. a direction from prior-coordinates 38 to present-coordinates 40, by of the host-vehicle 12 during the time-interval 36 since the prior-coordinates 38 of the host-vehicle 12 were determined. By way of example and not limitation, the heading-traveled 48 may initially be based on a prior heading from a compass reading or a GPS indicated heading from prior to T1. After T1, and optionally if the GPS can no longer be relied upon, the heading-traveled 48 may be adjusted or updated based on detected changes in direction indicated by data from the IMU 26 and/or the wheel-sensors 18. For example, the IMU may indicate a non-zero value of a yaw-rate 50 and that data may be used to determine a change in heading-traveled 48 from a prior-heading. The yaw-rate 50 may be directly measured with a gyroscope of the IMU 26, or estimated using other means such as an indication that the steering-angle of wheels of the host-vehicle 12 are at some angle other than straight, or a lateral-acceleration indicated by a lateral-accelerometer of the IMU 26, and/or a wheel-tick-differential indicating that a left-wheel is rotating at a different speed than a right-wheel. The controller 30 then determines the present-coordinates 40 (at T2) of the host-vehicle 12 based on the distance-traveled 24 and the heading-traveled 48.

In some circumstances, it may not be advantageous to presume that the host-vehicle 12 is traveling on a roadway that is aligned with an instance of the cardinal-direction 46, so it may not be advantageous to determine a value for the coordinate-correction 42. When this happens, it may be better to just accept any errors arising from the use of dead-reckoning to track the position coordinates of the host-vehicle 12. One circumstance to avoid relying on dead-reckoning may be when the host-vehicle 12 is moving slow as sensors in the IMU 26 may not be sufficiently sensitive and accurate enough to provide data with an adequate signal-to-noise ratio. As such, one possible test is to determine when the vehicle-speed 22 is greater than a speed-threshold 52. If the vehicle-speed 22 is greater than a speed-threshold 52, then it may be advantageous to determine a value for the coordinate-correction 42.

Another circumstance is to only determine or apply the coordinate-correction 42 when the deviation or difference from the cardinal-direction 46 is greater than system noise, but is still close enough to the cardinal-direction 46 to suggest that the roadway is likely aligned with the cardinal-direction 46. As such, the controller 30 (or the processor 32) is configured to determine when the heading-traveled 48 differs from a cardinal-direction 46 (North, South, East, West) by both greater than a noise-threshold 54, e.g. two-degrees-angle, and less than an angle-threshold 56, e.g. fifteen-degrees-angle. That is, the absolute difference value of the heading-traveled 48 and the cardinal-direction 46 must be between the values of the noise-threshold 54 and the angle-threshold 56 for the coordinate-correction 42 to be useful.

The controller 30 is configured to, in response to a determination that both the vehicle-speed 22 is greater than the speed-threshold 52 and that the heading-traveled 48 differs from the cardinal-direction 46 by both greater than the noise-threshold 54 and less than the angle-threshold 56, determine a value for the coordinate-correction 42 to apply to the present-coordinates 40 to correct or compensate for potential errors in the position coordinates because dead-reckoning was being used to update the position coordinates. In this example, the coordinate-correction 42 is determined in accordance with (i.e. based on), but not limited to, the distance-traveled 24, the heading-traveled 48, and the cardinal-direction 46.

After the coordinate-correction 42 is determined and applied to the present-coordinates 40, the result of that correction may be used as the prior-coordinates 38A for the T2 to T3 interval of time, and the process of determining a heading and distance from the prior-coordinates 38A to the subsequent coordinates at T3 is repeated, and another coordinate-correction may be determined. That is, at the end if each time-interval 36, a new value of the coordinate-correction may be determined and applied to minimize errors caused by dead-reckoning. Other factors may influence the value of the coordinate-correction 42, some of which are described below.

The controller 30 or the processor 32 may also be configured or programmed to determine a corrected-heading 48A that can be used as the value for the heading-traveled 48 during a subsequent segment of travel during the time-interval 36 between times T2 and T3. The corrected-heading 48A may be calculated in accordance with or based on the distance-traveled 24 and the coordinate-correction 42 using known geometric techniques, which may include an optional weighting using techniques/algorithms described below.

Rather than limit the application of the coordinate-correction 42 to a binary decision, i.e. a YES or NO decision to apply the coordinate-correction 42, it is proposed to weight or blend or make a partial application of the coordinate-correction 42 to the present-coordinates 40. In one embodiment, the yaw-rate 50 of the host-vehicle 12 is used to determine a weighting-factor 58 to apply to, e.g. multiply, the coordinate-correction 42. By way of example, the weighting-factor 58 may be set to one (1) when the yaw rate is relatively low (e.g. less than three-degrees-angle per second) and exhibits multiple sign-changes (e.g. more than two sign changes) during the time-interval 36. That is, the coordinate-correction 42 is determined in accordance with a weighting-factor 58 that is characterized as dependent on a yaw-rate 50 of the host-vehicle 12.

The yaw-rate 50 may be determined based on any one or combination of signals from, but not limited to, a yaw-sensor, a lateral-accelerometer, a steering-wheel-angle, and/or left/right wheel speed difference. The weighting-factor 58 may be characterized as being inversely proportional, e.g. proportional to $1/\text{Yaw}$ or $1/\text{Yaw}^2$. It is also contemplated the calculation of the weighting-factor 58 may include offsets and/or limits. For example, the weighting-factor 58 may be set to one (1) for yaw-rates less than three-degrees-angle per second, zero (0) for yaw-rates greater than fifteen-degrees-angle per second, and then the $1/\text{Yaw}$ or $1/\text{Yaw}^2$ function is used to smoothly transition the weighting-factor from 1 to 0 for yaw-rates between than three-degrees-angle per second and fifteen-degrees-angle per second. That is, the controller-circuit 30 (or the processor 32) is configured to set the weighting-factor 58 to zero (0) when the yaw-rate 50 is greater than a yaw-threshold 60, fifteen-degrees-angle per second. Setting the weighting-factor 58 to zero has been described by some as freezing the coordinate correction process.

As suggested above, if the left and right wheel speeds are consistently different during the time-interval 36, e.g. a left-wheel-speed 62 (e.g. the rotational speed of the left front wheel) is greater than a right-wheel-speed 64 (e.g. the rotational speed of the right front wheel) by more than a difference-threshold 66 during the time-interval, then that may be an indication that the host-vehicle is executing a right-hand turn, assuming that the circumference of the left-wheel and the right-wheel are substantially equal. Accordingly, the controller-circuit 30 may be configured to determine the left-wheel-speed 62 based on the left-wheelsignal 20A, determine a right-wheel-speed 64 based on the right-wheel-signal 20B, and set the weighting-factor 58 to zero when the left-wheel-speed 62 and the right-wheel-speed 64 differ by greater than a difference-threshold 66. In the event that the vehicle-speed 22 is determined based on the wheel-signals 20, a value for distance per pulse or tick can be determine for each individual wheel, which can be multiplied by this to determine distance traveled by each wheel during the time-interval 36. These distance/pulse values may be calibrated by determining distance traveled from the GPS while in traveling a straight line, and then dividing this distance by the total number of pulses seen in the left-wheel-signal 20A and the right-wheel-signal 20B seen during the same period of time. This value may then be entered into a low pass filter with unity gain, and calculations are not done when no pulses are received in by the controller 30.

It is recognized that when the host-vehicle 12 is traveling in a relatively straight line the sign (e.g. +, -) of some variables such as the yaw-rate 50 and/or the difference between the left-wheel-speed 62 and the right-wheel-speed 64 may fluctuate as these values dither about zero. As such, in one embodiment, the controller-circuit 30 may be configured to determine a yaw-sign 68 of the yaw-rate 50 and a wheel-sign 70 of a difference of the left-wheel-speed 62 and a right-wheel-speed 64, and then set the weighting-factor 58 to zero when the yaw-sign 68 does not match the wheel-sign 70. This assumes that the yaw-sign 68 and the wheel-sign 70 are determine so that, for example, both are positive (+) when the host-vehicle is executing a right-hand turn.

Figure 3A:
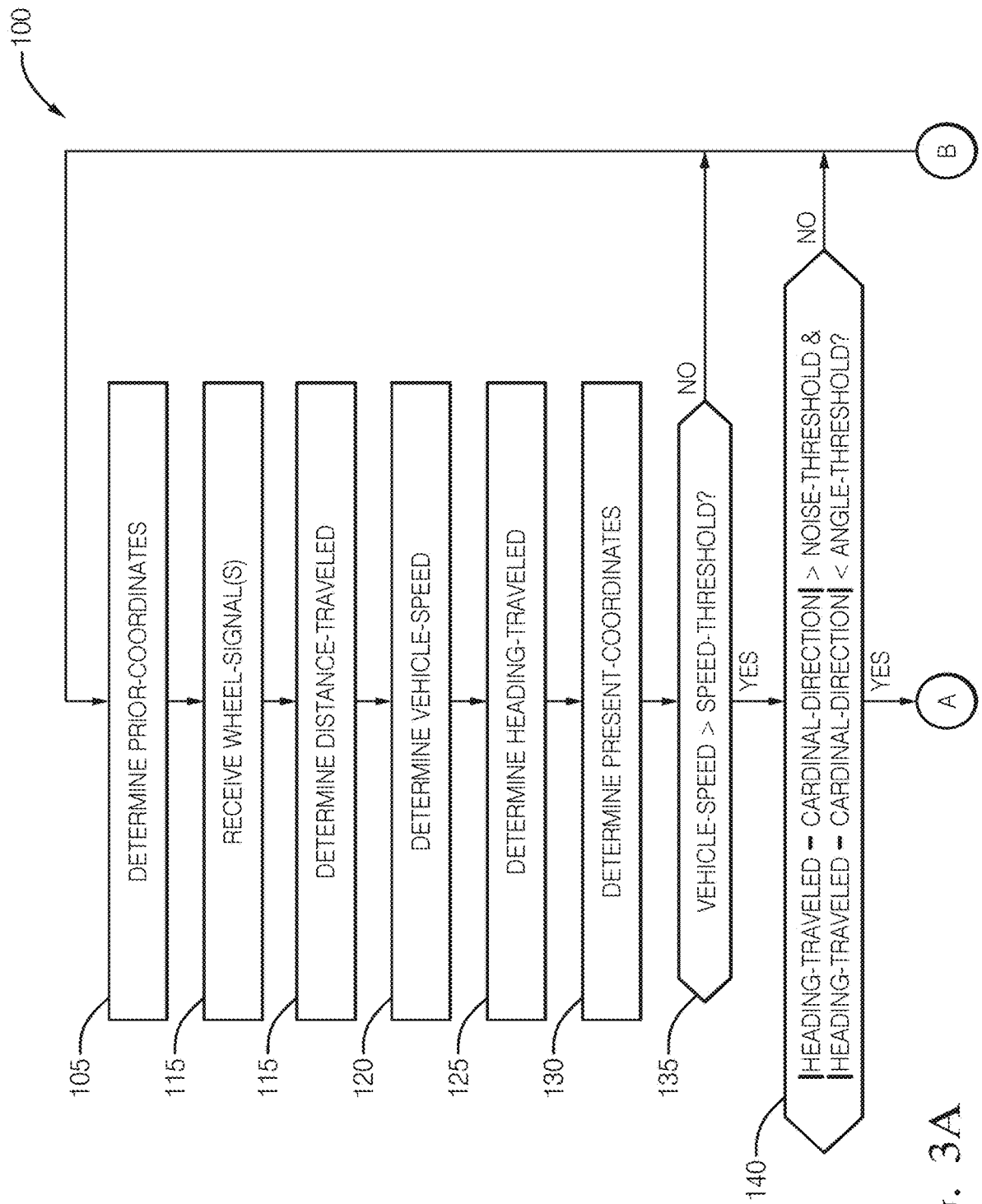
FIGS. 3A and 3B, combined, illustrate a method of operating the system of FIG. 1 in accordance with one embodiment.
Figure 3B:
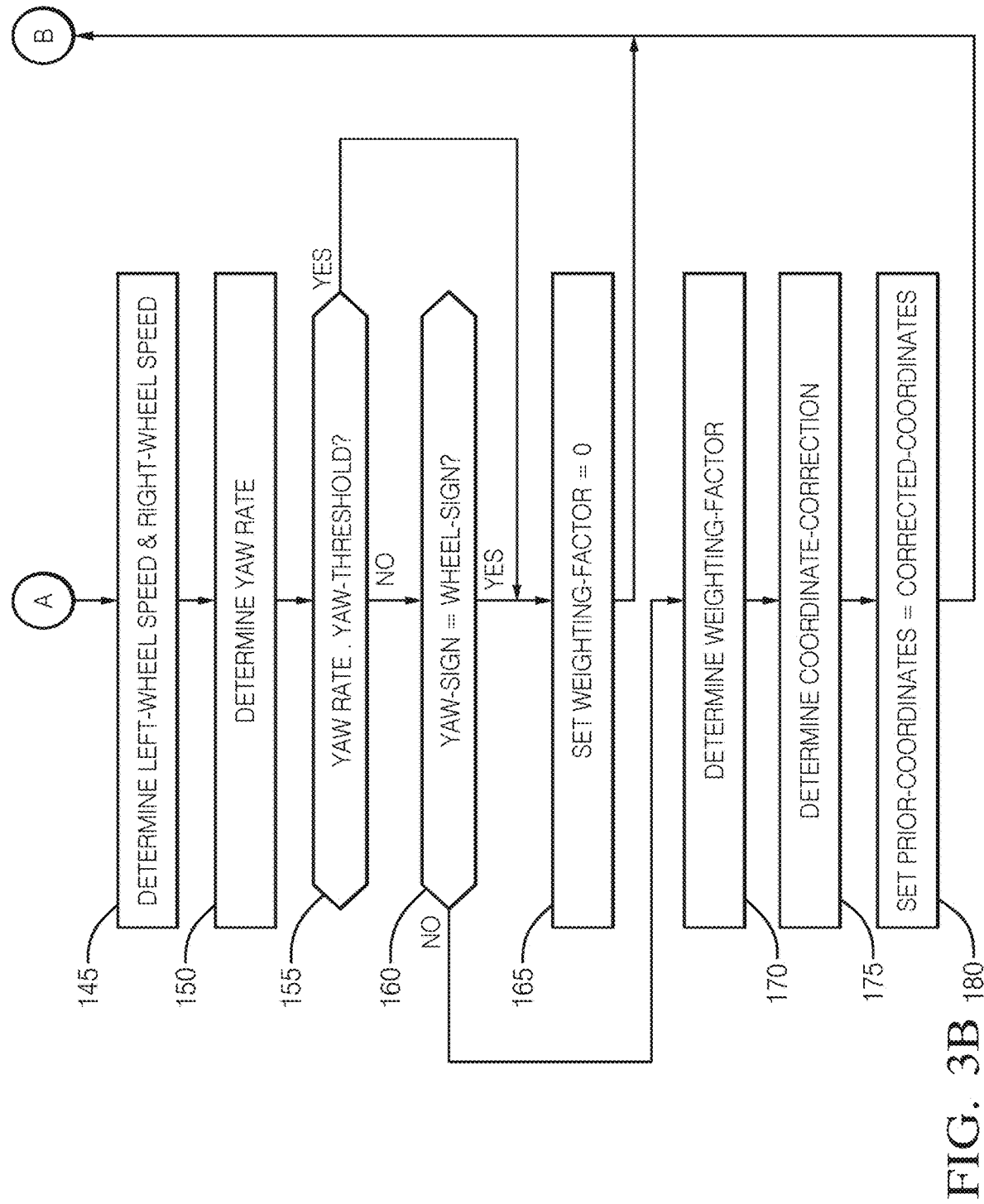

FIGS. 3A and 3B illustrate a non-limiting example of a method 100 of operating a dead-reckoning guidance system 10.

Step 105, DETERMINE PRIOR-COORDINATES, may include using the most recent coordinates determine using GPS before GPS became unavailable, or accepting position coordinates determined used dead-reckoning, which may or may not have been adjusted with the coordinate-correction 42, as described herein. The prior-coordinates 38 are used as a starting point for a segment of travel during the next instance of the time-interval 36 where the position coordinates of the host-vehicle 12 are tracked using dead-reckoning. As will be recognized by those in the art, dead-reckoning relies on vehicle data such as data from the IMU 26 and/or the wheel-sensors 18 to track/update the coordinate position of the host-vehicle 12.

Step 110, RECEIVE WHEEL-SIGNAL(S), may include receiving the wheel-signals 20 from one or more wheel-sensors 18 operable to detect movement of one or more wheels of a host-vehicle 12. The wheel-signals 20 may be communicated over wires or wirelessly to the controller 30. In one embodiment, the wheel-signals 20 consist of a string or series of pulses, where each pulse indicates some known amount of wheel rotation, e.g. five degrees.

Step 115, DETERMINE DISTANCE-TRAVELED, may include determining a distance-traveled 24 by the host-vehicle 12 during a time-interval 36 that has passed since the prior-coordinates 38 of the host-vehicle 12 were determined in step 105. By way of example, the distance-traveled 24 may be determined based on the number of pulses received from the wheel-sensors 18 during the time-interval 36.

Step 120, DETERMINE VEHICLE-SPEED, may include determining a vehicle-speed 22 of the host-vehicle 12 based on the wheel-signals 20 from the one or more wheel-sensors 18. The vehicle-speed 22 may be, but is not limited to, an averaged-value averaged over the time-interval 36, or a maximum or minimum value detected during the time-interval 36.

Step 125, DETERMINE HEADING-TRAVELED, may include determining a heading-traveled 48 of the host-vehicle 12 during the time-interval 36 since the prior-coordinates 38 of the host-vehicle 12 were determined. The heading-traveled 48 may be based or initiated using the heading of the host-vehicle 12 at the prior-coordinates 38, and then updated during the time-interval 36 in response to signals received from the IMU 26 and/or the wheel-sensors 18, e.g. detected yaw and/or lateral acceleration.

Step 130, DETERMINE PRESENT-COORDINATES, may include determining the present-coordinates 40 of the host-vehicle 12 based on the distance-traveled 24 and the heading-traveled 48. The present-coordinates 40 correspond to the prior-coordinates 38 plus any dead-reckoning updates indicative of movement detected by the IMU 26 and/or the wheel-sensors 18. As described elsewhere herein, it is anticipated that these dead-reckoning updates may include some errors, which in some conditions may be corrected or reduced as describe below.

Step 135, VEHICLE-SPEED 2>SPEED-THRESHOLD?, may include determining when the vehicle-speed 22 determine in step 120 is greater than a speed-threshold 52, e.g. fifteen-kilometers-per-hour (15 kph), which is a calibrated value stored in the controller 30. The determination of what value to use for the speed-threshold 52 may be determine using empirical testing and/or engineering judgement. If the vehicle-speed is too slow, i.e. less than the speed- Step 140, |READING-TRAVELED—CARDINAL-DIRECTION|>NOISE-THRESHOLD & |READING-TRAVELED—CARDINAL-DIRECTION|<ANGLE-THRESHOLD?, may include determining when the heading-traveled 48 differs from a cardinal-direction 46 by both greater than a noise-threshold 54 and less than an angle-threshold 56. This test is performed to avoid applying corrections to the position coordinates if the heading-traveled 48 is so close to the cardinal-direction 46 that most of the difference is likely noise and if the heading-traveled 48 is so far away from the cardinal-direction 46 that it is likely the roadway or travel-path of the host-vehicle is not in line with the cardinal-direction 46.

Step 145, DETERMINE LEFT-WHEEL-SPEED & RIGHT-WHEEL-SPEED, is an optional step that may include determining a left-wheel-speed 62 based on the left-wheel-signal 20A, determining a right-wheel-speed 64 based on the right-wheel-signal 20B, and setting the weighting-factor 58 to zero when the left-wheel-speed 62 and the right-wheel-speed 64 differ by greater than a difference-threshold 66. If the left-wheel-speed 62 and the right-wheel-speed 64 differ by greater than a difference-threshold 66 it is an indication that the host-vehicle is traveling in a curved path, i.e. not a straight path, so a value of the coordinate-correction cannot be determine based on an assumption that the host-vehicle 12 is traveling in the cardinal-direction 46.

Step 150, DETERMINE YAW-RATE, may include receiving data from the IMU 26 and/or the wheel-sensors 18, and then calculating the yaw-rate 50 based on that data. The yaw-rate 50 may be calculated once or multiple times during the time interval, and may be an averaged value or a detected maximum or minimum value of the sampled yaw-rates.

Step 155, YAW-RATE>YAW-THRESHOLD?, may include setting the weighting-factor 58 to zero (see step 165) when the yaw-rate 50 is greater than a yaw-threshold 60, e.g. fifteen-degrees-angle per second, because the host-vehicle 12 is executing a turn and the coordinate-correction 42 is determined based on an assumption or condition that the host-vehicle 12 is traveling in a relatively straight line and in a direction or heading that is substantially aligned with the cardinal-direction 46.

Step 160, YAW-SIGN=WHEEL-SIGN?, is an optional test that may include determining a yaw-sign 68 of the yaw-rate 50 and a wheel-sign 70 of a difference of a left-wheel-speed 62 and a right-wheel-speed 64, and setting the weighting-factor 58 to zero (step 165) when the yaw-sign 68 matches the wheel-sign 70. That the yaw-sign 68 matches the wheel-sign 70 may be an indication that the host-vehicle 12 is traveling in a curve so the coordinate-correction 42 for dead-reckoning should not be used.

Step 165, SET WEIGHTING-FACTOR=0, may include setting the weighting-factor 58 to zero when conditions in steps 155 and 160 are detected.

Step 170, DETERMINE WEIGHTING-FACTOR, may include calculating the weighting-factor 58 based on a variety of factors such as the yaw-rate 50.

Step 175, DETERMINE COORDINATE-CORRECTION, may include, in response to a determination that both the vehicle-speed 22 is greater than the speed-threshold 52 and that the heading-traveled 48 differs from the cardinal-direction 46 by both greater than the noise-threshold 54 and less than the angle-threshold 56, determining a coordinate-correction 42 to apply to the present-coordinates 40. The coordinate-correction 42 is determined in accordance with the distance-traveled 24 and the cardinal-direction 46. For example, step 175 may include determining the coordinate-correction 42 in accordance with a weighting-factor 58 that is characterized as dependent on a yaw-rate 50 of the host-vehicle 12.

Step 180, SET PRIOR-COORDINATES=CORRECTED-COORDINATES, may include replacing the prior-coordinates 38 used for the T1 to T2 time interval with the corrected-coordinates determine at T2, and then using that value as the prior-coordinates 38A for the T2 to T3 time interval.

Described herein is a first device 30 that includes one or more processors 32; memory 34; and one or more programs 105-180 stored in memory 34. The one or more programs 105-180 including instructions for performing all or part of the method 100. Also, described herein is a non-transitory computer-readable storage-medium 34 that includes one or more programs 105-180 for execution by one or more processors 32 of a first device 30, the one or more programs 105-180 including instructions which, when executed by the one or more processors 32, cause the first device to perform all or part of the method 100.

Accordingly, a dead-reckoning guidance system (the system 10), a controller 30 for the system 10, and a method 100 of operating the system 10 are provided. The system 10 and the method 100 provide means by which at least some errors arising during dead-reckoning updates of position coordinates, e.g. latitude, longitude, elevation.

While this invention has been described in terms of the preferred embodiments thereof, it is not intended to be so limited, but rather only to the extent set forth in the claims that follow.

What is claimed is:

1. A system comprising:
a controller circuit of a host vehicle, the controller circuit being configured to:
determine prior coordinates of the host vehicle;
determine a distance and a heading traveled by the host vehicle since determining the prior coordinates of the host vehicle;
determine when the heading traveled differs from a cardinal direction by being both greater than a noise threshold and less than an angle threshold;
responsive to determining that the heading traveled differs from the cardinal direction by being both greater than the noise threshold and less than the angle threshold, determine, based on the distance traveled and the cardinal direction, a coordinate correction to present coordinates of the host vehicle; and
responsive to determining the coordinate correction to the present coordinates of the host vehicle, provide the present coordinates of the host vehicle as an input to an automated mode of the host vehicle controlling operation of the host vehicle.

2. The system of claim 1, wherein the controller circuit is configured to determine the coordinate correction based further on applying a weighting factor to the coordinate correction that depends on a yaw rate of the host vehicle.

3. The system of claim 2, wherein the controller circuit is configured to set the weighting factor to zero when the yaw rate is greater than a yaw threshold.

4. The system of claim 2, wherein the controller circuit is configured to determine a left-wheel speed based on a left-wheel signal, determine a right-wheel speed based on a right-wheel signal, and set the weighting factor to zero when the left-wheel speed and the right-wheel speed differ by greater than a difference threshold.

5. The system of claim 2, wherein the controller circuit is configured to determine a yaw sign of the yaw rate and a wheel sign of a difference of a left-wheel speed and a right-wheel speed, and set the weighting factor to zero when the yaw sign does not match the wheel sign.

6. The system of claim 1, wherein the controller circuit is configured to determine corrected heading in accordance with the distance traveled and the coordinate correction.

7. The system of claim 1, wherein the controller circuit is further configured to:
determine a vehicle speed of the host vehicle;
determine when the vehicle speed is greater than a speed threshold; and
determine the coordinate correction to the present coordinates of the host vehicle further responsive to determining that the vehicle speed is greater than the speed threshold.

8. The system of claim 7, wherein the controller circuit is configured to determine the vehicle speed of the host vehicle based on wheel movement detected by one or more sensors of the host vehicle.

9. The system of claim 8, wherein the controller circuit is further configured to:
determine the wheel movement detected by the one or more sensors of the host vehicle by receiving wheel signals from the one or more sensors.

10. A method for dead reckoning a position of a host vehicle, the method comprising:
determining prior coordinates of the host vehicle;
determining a distance and a heading traveled by the host vehicle since determining the prior coordinates of the host vehicle;
determining when the heading traveled differs from a cardinal direction by being both greater than a noise threshold and less than an angle threshold; and
responsive to determining that the heading traveled differs from the cardinal direction by being both greater than the noise threshold and less than the angle threshold, determining, based on the distance traveled and the cardinal direction, a coordinate correction to present coordinates of the host vehicle; and responsive to determining the coordinate correction to the present coordinates of the host vehicle, providing the present coordinates of the host vehicle as an input to an automated mode of the host vehicle controlling operation of the host vehicle.

11. The method of claim 10, wherein determining the coordinate correction comprises determining the coordinate correction based further on applying a weighting factor to the coordinate correction that depends on a yaw rate of the host vehicle.

12. The method of claim 11, further comprising:
setting the weighting factor to zero when the yaw rate is greater than a yaw threshold.

13. The method of claim 11, further comprising:
determining a left-wheel speed of the host vehicle;
determining a right-wheel speed of the host vehicle, and
setting the weighting factor to zero when the left-wheel speed and the right-wheel speed differ by greater than a difference threshold.

14. The method of claim 11, further comprising:
determining a yaw sign of the yaw rate and a wheel sign of a difference of a left-wheel speed of the host vehicle and a right-wheel speed of the host vehicle; and
setting the weighting factor to zero when the yaw sign does not match the wheel sign.

15. The method of claim 10, further comprising:
determining a corrected heading based on the distance traveled and the coordinate correction.

16. The method of claim 10, further comprising:
determining a vehicle speed of the host vehicle;
determining when the vehicle speed is greater than a speed threshold; and
determining the coordinate correction to the present coordinates of the host vehicle further responsive to determining that the vehicle speed is greater than the speed threshold.

17. The method of claim 16, further comprising:
determining the vehicle speed of the host vehicle based on wheel movement detected by one or more sensors of the host vehicle.

18. The method of claim 17, further comprising:
determining the wheel movement detected by the one or more sensors of the host vehicle by receiving wheel signals from the one or more sensors.

19. A non-transitory computer-readable storage medium comprising instructions that, when executed by a processor of a system of a host vehicle, configure the processor to:
determine prior coordinates of the host vehicle;
determine a distance and a heading traveled by the host vehicle since determining the prior coordinates of the host vehicle;
determine when the heading traveled differs from a cardinal direction by being both greater than a noise threshold and less than an angle threshold; and
responsive to determining that the heading traveled differs from the cardinal direction by being both greater than the noise threshold and less than the angle threshold, determine, based on the distance traveled and the cardinal direction, a coordinate correction to present coordinates of the host vehicle; and
responsive to determining the coordinate correction to the present coordinates of the host vehicle, provide the present coordinates of the host vehicle as an input to an automated mode of the host vehicle controlling operation of the host vehicle.

20. The non-transitory computer-readable storage medium of claim 19, wherein the instructions, when executed, configure the processor to determine the coordinate correction based further on applying a weighting factor to the coordinate correction that depends on a yaw rate of the host vehicle.

* * * * *